United States Patent [19]

Moertel

[11] 4,137,034

[45] Jan. 30, 1979

[54] APPARATUS FOR MANUFACTURING OF TRAINS OF SLIDE FASTENING ELEMENTS

[75] Inventor: George B. Moertel, Conneautville, Pa.

[73] Assignee: Textron, Inc., Providence, R.I.

[21] Appl. No.: 873,742

[22] Filed: Jan. 30, 1978

Related U.S. Application Data

[60] Division of Ser. No. 659,881, Feb. 20, 1976, which is a continuation-in-part of Ser. No. 601,787, Aug. 4, 1975, Pat. No. 4,084,296.

[51] Int. Cl.² .............................................. B29D 5/00
[52] U.S. Cl. ...................................... 425/545; 425/814; 425/308
[58] Field of Search .................... 425/126, 129 R, 545, 425/814, 308

[56] References Cited

U.S. PATENT DOCUMENTS

| 2,169,178 | 8/1939 | Sunback | 425/814 |
| 3,196,196 | 7/1965 | Burbank | 425/814 |
| 3,414,948 | 12/1968 | Cuckson et al. | 425/814 |
| 3,445,915 | 5/1969 | Cuckson et al. | 425/814 |
| 3,594,865 | 7/1971 | Erb | 425/814 |
| 3,849,042 | 1/1974 | Anderegg | 425/814 |
| 3,897,192 | 7/1975 | Heimberger et al. | 425/814 |
| 3,917,787 | 11/1975 | Hansen | 425/814 |

Primary Examiner—J. Howard Flint, Jr.
Attorney, Agent, or Firm—O'Brien and Marks

[57] ABSTRACT

In the manufacture of trains of fastening elements for slide fasteners, flowable synthetic polymer resin is injected into gate or runner channels formed in a cavity wheel and extending beneath one edge of a band enclosing cavities of the cavity wheel such that the flowable synthetic polymer resin flows through the channels into the cavities to form fastening elements.

10 Claims, 12 Drawing Figures

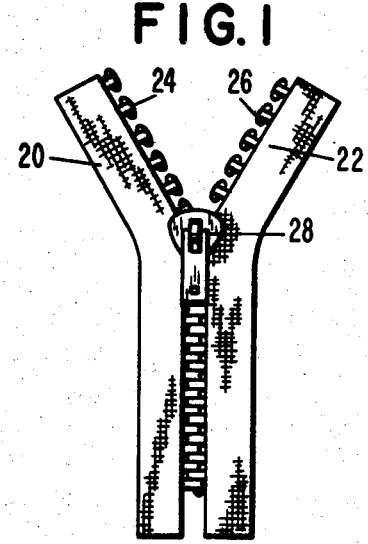
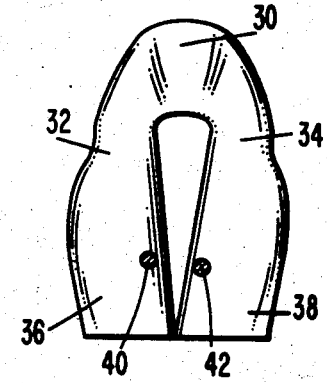
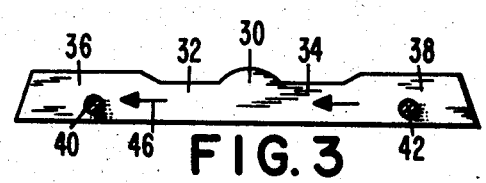
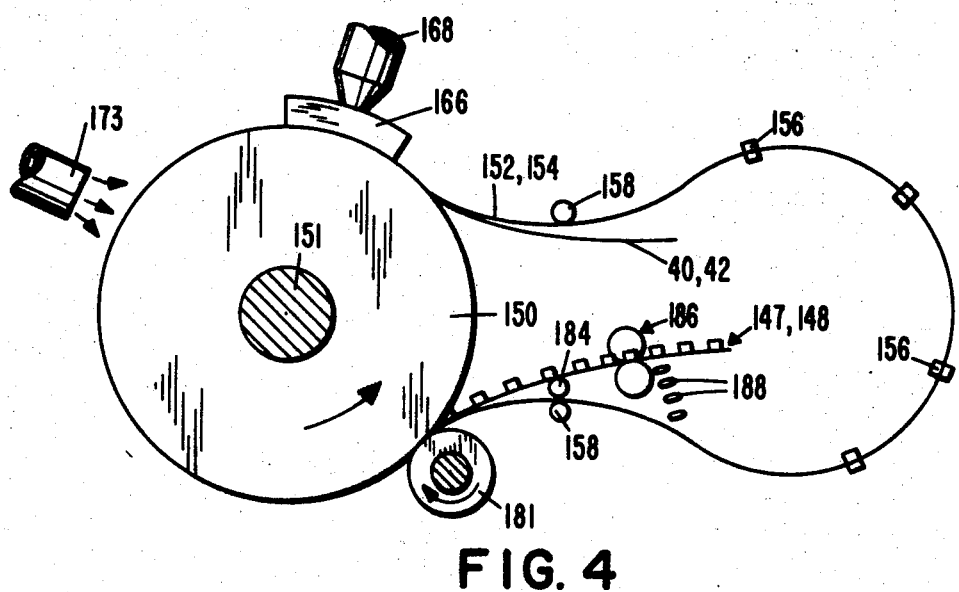

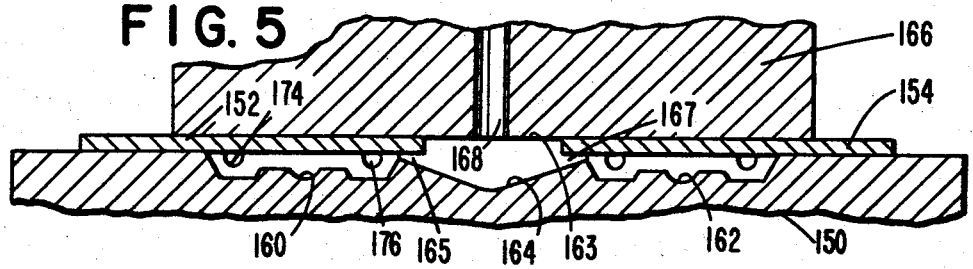
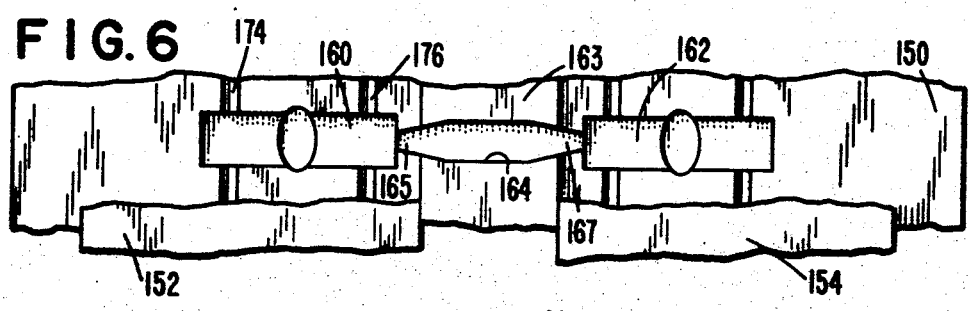
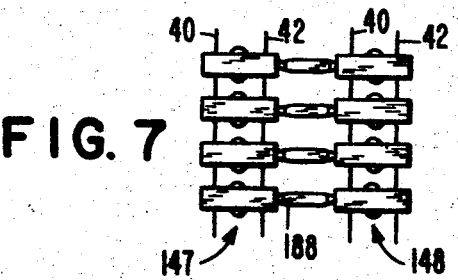
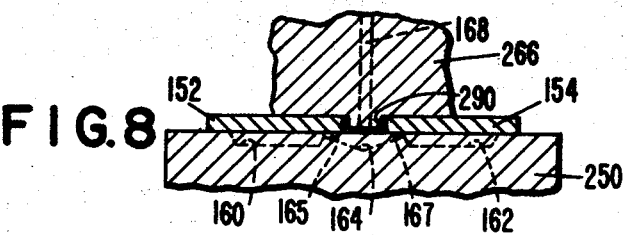
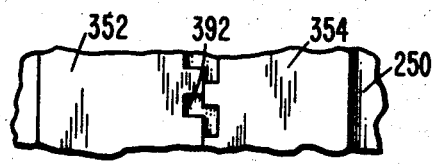
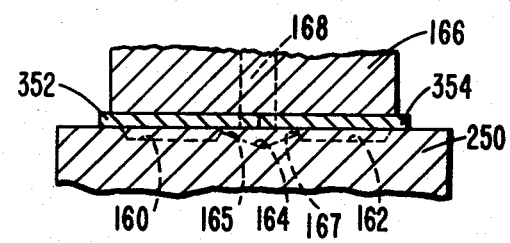

FIG. 11
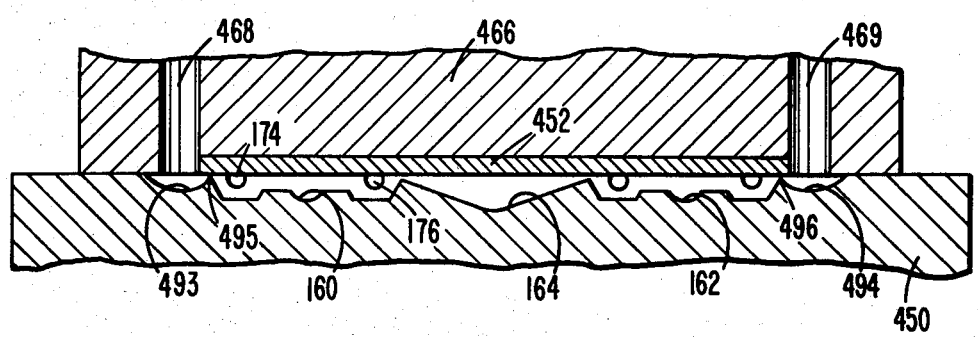
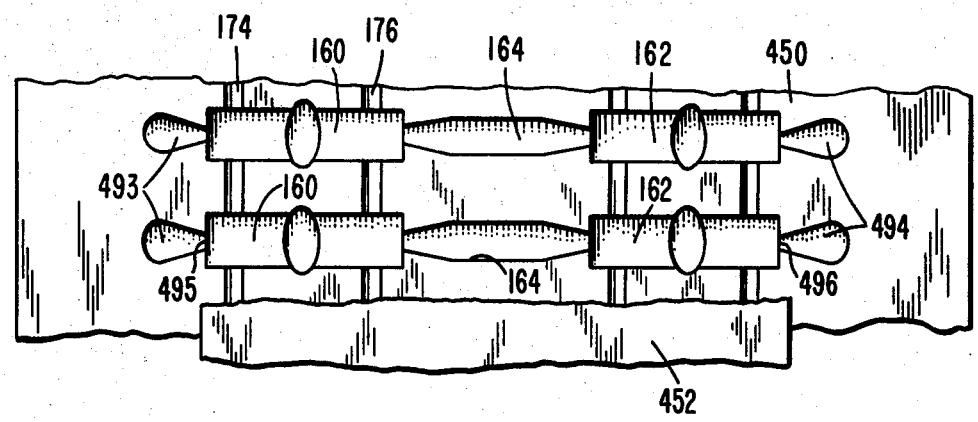
FIG. 12

APPARATUS FOR MANUFACTURING OF TRAINS OF SLIDE FASTENING ELEMENTS

CROSS REFERENCE TO RELATED APPLICATIONS

This application is a Division of my prior copending application Ser. No. 659,881 filed Feb. 20, 1976, which is a continuation-in-part of my prior application Ser. No. 601,787 filed Aug. 4, 1975, now U.S. Pat. No. 4,084,296, said prior applications being hereby incorporated herein by reference.

BACKGROUND OF THE INVENTION

1. Field of the Invention

The invention relates particularly to apparatus for the manufacture of molded interlocking elements for slide fasteners.

2. Description of the Prior Art

The prior art, as exemplified in U.S. Pat. Nos. 2,496,926, 3,179,996, 3,328,857, 3,414,948, 3,445,915, 3,487,531, and 3,770,862 and British Patent Nos. 446,336 and 871,458, contains a number of slide fasteners with fastening elements or scoops made by molding metal or thermoplastic resins. In one prior art technique of forming fastener elements by molding thermoplastics in a cavity wheel, the molten thermoplastic is injected directly into cavities defining the fastener elements from an injection shoe engaging the wheel; such molded fastener elements are often subject to failure and breakage at the leg portions adjacent the head portion during use or when folded to form the elements from elongated straight molded bodies. Additionally, it has been previously suggested to utilize a band to enclose the cavities in the cavity wheel with holes through the band for passing the molten thermoplastic from an injection shoe slidingly engaging the band; such manufacture of molded fastening elements requiring a band with accurately formed holes as well as requiring the stripping of flash and the like formed between the injection shoe and the band to allow separation of the train of fastening elements from the band.

SUMMARY OF THE INVENTION

The invention is summarized in an apparatus for carrying out a process of forming a train of fastening elements for a slide fastener including rotating a cavity wheel having a row of elongated cavities formed in a periphery of the wheel, each cavity defining a head forming portion and a pair of leg forming portions extending from opposite sides of the head forming portion along the longitudinal dimension of the cavity, the cavity wheel having a plurality of gate channels each extending from one of the pair of leg forming portions of each cavity; bringing a band into engagement with the periphery of the cavity wheel during a portion of the angular rotation of the cavity wheel to enclose the cavities such that the gate channels extend to one side of the band; injecting a flowable synthetic polymer resin into each of the gate channels at the one side of the band such that the flowable synthetic polymer resin flows in one direction from each gate channel into each respective cavity along the one leg forming portion, the head forming portion and the other leg forming portion; and hardening the flowable synthetic polymer resin in the cavities to form a train of fastening elements.

An object of the invention is to construct an interlocking element for a slide fastener which is less expensive, stronger, and more reliable than prior art fastening elements.

Another object of the invention is to form fastening elements by laminar flow of synthetic polymer resin along the longitudinal dimension of the elements so as to produce substantially greater strength of the elements.

It is also an object of the invention to eliminate the necessity of separate steps and mechanisms for removing flash.

A further object of the invention is to simplify the design of the apparatus for manufacture of molded trains of thermoplastic fastening elements.

One advantage of the invention is that the fastening elements may be removed from the apparatus by simply separating a band from the cavity wheel and then separating the fastening elements from the band.

Other objects, advantages and features of the invention will be apparent from the following description taken in conjunction with the accompanying drawings.

BRIEF DESCRIPTION OF THE DRAWINGS

FIG. 1 is a plan view of a slide fastener having fastening elements constructed in accordance with the apparatus of the invention.

FIG. 2 is an elevation view of a fastening element of the slide fastener of FIG. 1.

FIG. 3 is a side view of a molded body prior to bending to form the fastener element of FIG. 2.

FIG. 4 is an elevation view of an apparatus for forming a train of the molded bodies of FIG. 3.

FIG. 5 is a cross section view taken perpendicular to the view of FIG. 4 of an injection molding portion broken away from the apparatus of FIG. 4.

FIG. 6 is a plan view of the injection molding portion of FIG. 5.

FIG. 7 is a plan view of a pair of trains of fastening elements formed by the apparatus of FIGS. 4, 5 and 6.

FIG. 8 is a cross section view of a modification of the injection molding portion of the apparatus shown in FIGS. 4, 5 and 6.

FIG. 9 is a plan view of another modification of the injection molding portion of the apparatus shown in FIGS. 4, 5, and 6.

FIG. 10 is a cross section view of the modification of FIG. 9.

FIG. 11 is a cross section view similar to FIG. 5 of still another modification of the injection molding portion of the apparatus.

FIG. 12 is a plan view of the modification of FIG. 11.

DESCRIPTION OF THE PREFERRED EMBODIMENTS

As illustrated in FIG. 1 a slide fastener manufactured in accordance with the invention includes a pair of carrier tapes 20 and 22 having respective pluralities of interlocking or fastening elements 24 and 26 suitably secured to inner edges of tapes 20 and 22. A slider 28 is slidable over the pluralities of interlocking elements 24 and 26 for opening and closing the slide fastener in a conventional manner.

The fastening elements 24 and 26 are substantially identical and as shown in FIG. 2 each of the fastening elements has an elongated body with a central enlarged head portion 30, and a pair of short leg portions 32 and 34 joining with respective heel portions 36 and 38. Connecting threads or filaments 40 and 42 are imbedded in the respective heel portions 36 and 38. As shown in FIG. 3 each of the bodies of the fastening elements is initially formed with the head portion 30, the pair of leg portions 32 and 34 and the heel portions 36 and 38 extending along a straight line. The heel portions 36 and 38 extend generally from opposite sides of the head portion 30 and are joined thereto by the leg portions 32 and 34 which are cut out along their upper edges (as viewed in FIG. 3). The elements are bent so that the heel portions 36 and 38 extend in substantially the same direction from the head portions 30.

The bodies of the fastening elements are molded from a synthetic polymer resin, such as one of the thermoplastic resins nylon 6, nylon 6-6, polypropylene, polyethylene, polyester and acetal. As illustrated by the arrows 46 in FIG. 3 the molded bodies of the fastening elements are formed by laminar flow, i.e. flow in one direction, of flowable synthetic polymer resin from the heel portions 38 through one leg portion 34, the head portion 30 and the leg portion 32 to the heel portion 36.

An apparatus, illustrated in FIGS. 4–6, for manufacturing a pair of trains, indicated generally at 147 and 148 in FIG. 7 of the molded bodies of FIG. 3 includes a cavity wheel 150 driven by suitable drive means 151 together with a pair of cover bands, such as stainless steel bands 152 and 154, suitably guided by guides 156 and rollers 158. The bands 152 and 154 engage a peripheral portion of the cavity wheel 150 between first and second angular positions of the cavity wheel 150. The cavity wheel 150 has a pair of continuous spaced rows of fastening element forming cavities 160 and 162 in an outer peripheral surface of the cavity wheel 150. Each of the cavities 160 and 162 has a head forming portion, a pair of leg forming portions and a pair of heel forming portions corresponding to the respective head portion 30, leg portions 32 and 34, and heel portions 36 and 38 of the bodies of the fastening elements 24 and 26 as shown in FIG. 3. The elongated dimensions of the cavities 160 and 162 are parallel to the axis of the cavity wheel 150. The cavity wheel 150 has an annular rib or shoulder 163 formed on its periphery between the rows of cavities 160 and 162 and extending to a height equal to the thickness of the bands 152 and 154. A plurality of runner or gate channels 164 are formed in the rib 163 and terminate at opposite ends in gate portions 165 and 167 which open into the respective inner ends of the respective fastening element forming cavities 160 and 162. The bands 152 and 154 engaging the outer periphery of the cavity wheel 150 are positioned by the opposite sides of the rib 163 to enclose the respective cavities 160 and 162 and the gate portions 165 and 167 such that the channels 164 extend to the inside edges of the bands 152 and 154 or are exposed between the bands 152 and 154.

An injection means including an extrudate shoe 166 slidingly engages the outer surface of the rib 163 and the the outer surface of the bands 152 and 154. The extrudate shoe 166 has a passageway 168 for conducting pressurized flowable synthetic polymer resin into the runner channels 164. The shoe 166 is preferrably formed from a material selected to minimize wear on the cavity wheel 150 and the bands 152 and 154. Cooling means, such as a cool air source 173, is directed against the bands 152 and 154 and the cavity wheel 150 after rotation past the injection shoe 166 to aid in hardening the injected thermoplastic.

Each of the rows of cavities 160 and 162 are intersected at right angles in the heel forming portions thereof by a pair of grooves 174 and 176 extending completely around the outer periphery of the wheel 150. The grooves 174 and 176 have a suitable size to accomodate the connecting threads 40 and 42 such that the connecting threads will be embedded in polymer resin injected into the respective cavities 160 and 162.

A suitably driven band tension roller 181 can be included in the apparatus of FIG. 4 to help maintain the bands 152 and 154 in tight engagement with the periphery of the cavity wheel 150. A guide wheel 184 is positioned after the bands 152 and 154 are separated from the cavity wheel 150 to readily separate the molded trains of fastener elements 147 and 148 from the bands 152 and 154. A runner severing mechanism indicated generally at 186 is positioned after the roller 184 to sever the runners 188, FIG. 7, and any flash thereon from the fastening elements of the trains 147 and 148.

In the operation of the apparatus of FIGS. 4, 5 and 6, the cavity wheel 150 is rotated by the drive means 151 while the bands 152 and 154 are guided by the guides 156 and rollers 158 into engagement with the outer periphery of the wheel 150 to enclose the cavities 160 and 162 and the gate channel portions 165 and 167 between the extrudate shoe 166 and the band tension roller 181. Pairs of connecting filaments 40 and 42 are fed into the grooves 174 and 176 intersecting the cavities 160 and 162 prior to the engagement of the bands 152 and 154. Flowable synthetic polymer resin applied to the extrudate shoe 166 is injected through the passageway 168 into the runner channels 164 and hence flows through the gate portions 165 and 167 into the inner ends of the respective cavities 160 and 162. The flowable synthetic polymer resin flows from the inside end of each of the cavities 160 and 162 sequentially through one of the heel forming portions, one of the leg forming portions, the head forming portion, the other leg forming portion and finally to the other heel forming portion to produce a laminar flow throughout the longitudinal dimension of the cavities 160 and 162. The polymer resin also flows around the portions of the connecting filaments 40 and 42 in the cavities 160 and 162 to imbed such filament portions in the polymer resin. Subsequently the molten plastic injected into the cavities 160 and 162 is hardened such as by cooling.

By utilizing channels which extend from the cavities to edges of the bands 152 and 154, the necessity of utilizing bands 152 and 154 having gate holes formed therethrough is eliminated; thus a simpler apparatus is made possible and the necessity of removing flash from the outside of the bands to allow removal of sprues in gate holes in the bands is eliminated. Utilization of a pair of bands 152 and 154 spaced to expose channels 164 extending under the bands 152 and 154 to the rows of cavities 160 and 162 allows the use of a single extrudate shoe for making a pair of trains of the slide fastening elements.

Synthetic polymer resins have long chain molecules which are believed to be oriented by laminar flow of the plastic resin to produce an orientation of the long chain molecules along the longitudinal dimension of the molded bodies. Additionally, the laminar flow of the synthetic polymer resin may result in stratification of crystalline structure of the polymer resin as it hardens. Such orientation or stratification results in increased tensile strength of the leg portions 32 and 34, FIG. 2, along the longitudinal dimension of the fastening elements greatly reducing the likelihood of breakage of the leg portions 32 and 34 during folding of the heel portions 36 and 38 toward each other during use.

When the bands 152 and 154 disengage the cavity wheel 150 after the tension roller 181, the trains 147 and 148 are stripped from the cavities 160 and 162 along with the bands 152 and 154. Any flash on the outside of the bands 152 and 154 will be very thin and have substantially little strength so the flash can be easily stripped along with the trains 157 and 158 by the guide wheel 184 from the bands 152 and 154. After the stripping of the trains 147 and 148 from the wheel 150, the runner severing mechanism 186 severs the runners 188 together with any flash from the trains 147 and 148 thus separating the trains 147 and 148. The trains 147 and 148 are then processed in a conventional manner to form a slide fastener as shown in FIG. 1.

In a modification shown in FIG. 8 a modified cavity wheel 250 and extrudate shoe 266 replace the cavity wheel and extrudate shoe of the apparatus of FIGS. 4–6. Instead of a rib on the cavity wheel, a rib or extension 290 is formed on the shoe 266 to extend between the bands 152 and 154 so as to maintain the bands 152 and 154 in spaced relationship. The channels 164 formed in the periphery of the wheel 250 have portions exposed between the bands 152 and 154 and extend to the gate portions 165 and 167 beneath the inner edges of the bands 152 and 154.

In a modification illustrated in FIGS. 9 and 10, the bands 352 and 354 are substituted for the bands 152 and 154 and have inner edges formed with staggered cut outs 362 to form openings between the bands 352 and 354 exposing portions of the channel 164. Using the cut outs in the inner edge or a profiled edge of one or both of the bands 352 and 354 eliminates the necessity of a rib on either the cavity wheel or the extrudate shoe to maintain the bands spaced to expose the runner channels to the resin flow from the extrudate shoe.

Still another modification in FIGS. 11 and 12 has a modified cavity wheel 450, a single band 452, and a wide extrudate shoe 466 in place of the cavity wheel 150, pair of bands 152 and 154 and extrudate shoe 166 of FIGS. 4–6. The band 452 is wide enough to cover both of the cavities 160 and 162 in the wheel 450 and the channel 164 between the cavities 160 and 162. A pair of pluralities of entrance channels 493 and 494 are formed in the wheel 450 on respective sides of the pair of rows of cavities 160 and 162, and have gate portions 495 and 496 communicating with the outside ends of the respective cavities 160 and 162. The entrance channels 493 and 494 extend to the respective outside edges of the band 452 and are exposed on the opposite sides of the band 452. The injection shoe 466 is relatively wide or is formed with portions extending on opposite sides of the band 452, and has a pair of passageways 468 and 469, which can be branches of a single passageway, for communicating with the respective entrance channels 493 and 494 as the wheel 450 rotates. The injection shoe 466 has projections on opposite sides of the band 452 for firmly engaging the periphery of the wheel 450; or alternately other arrangements such as ribs on the wheel 450 etc. could be used to provide sliding communication with the channels 493 and 494. Synthetic polymer resin under pressure in the passageways 468 and 469 is injected through the entrance channels 493 and 494 into the outer ends of the elongated cavities 160 and 162 producing laminar flow of the synthetic resin sequentially through one of the heel forming portions, one of the leg forming portions, the head forming portion, the other leg forming portion and to the other heel forming portion. Any air within the cavities 160 and 162 along with any excess resin is allowed to escape into the channels 164; this tends to prevent air pockets from forming in the cavities 160 and 162 as well as reducing any tendency to produce flash under the band 452. Such air pockets and flash result in defectively formed fastener elements or require extra steps to remove the flash. The hardened stubs of resin formed in the channels 493 and 494 along with any skim on the opposite sides of the band 452 are easily cut away by the severing mechanism 186, FIG. 4.

Since many modifications, variations and changes in detail may be made to the described embodiments, it is intended that all matter contained in the foregoing description or shown in the accompanying drawings be interpreted as illustrative and not in a limiting sense.

I claim:

1. An apparatus for forming a train of fastening elements for a slide fastener comprising
    a cavity wheel having a row of fastening element forming cavities extending around the periphery of the cavity wheel,
    each of the fastening element forming cavities having a head forming portion and a pair of leg forming portions extending from opposite sides of the head forming portion,
    said cavity wheel having a plurality of channels each extending from one of the pair of leg forming portions of each respective cavity to one side of the row of cavities,
    a band for engaging the cavity wheel during a portion of the angular rotation of the cavity wheel to enclose the cavity wheel such that each of the channels extend to one side of the band, and
    means for injecting a flowable synthetic polymer resin into the channels at the one side of the band and into the cavities enclosed by the band.

2. An apparatus for forming a train of fastening elements for a slide fastener as claimed in claim 1 wherein
    the channels extend in the periphery past the one side of the band, and
    the injecting means includes an injection shoe slidably engaging the periphery of the cavity wheel on the one side of the band to inject synthetic polymer resin into the channels.

3. An apparatus for forming a train of fastening elements for a slide fastener as claimed in claim 2 wherein
    the cavity wheel has an annular rib on the one side of the band into which the channels extend, and
    the injection shoe engages the rib and a portion of the band adjacent the one side of the band.

4. An apparatus for forming a train of fastening elements for a slide fastener as claimed in claim 1 wherein
    the one edge of the band is formed with cut outs, and
    the injecting means includes an injection shoe slidably engaging the one edge of the band to inject synthetic polymer resin through the cut outs into the channels.

5. An apparatus for forming a pair of trains of fastening elements comprising
    a rotatable cavity wheel having a pair of spaced rows of fastening element forming cavities in the periphery of the cavity wheel;
    said cavities each having a head forming portion and a pair of leg forming portions extending from opposite sides of the head forming portion;
    said head forming portion and leg forming portions extending in a straight line parallel the axis of the cavity wheel;

a row of channels in the periphery of the cavity wheel between the pair of rows of cavities wherein each of the channels communicates through gate portions of the channels into respective ends of cavities in each of the pair of rows of cavities;

a pair of cover bands engaging the periphery of the cavity wheel over a predetermined arcuate portion between first and second angular positions of the cavity wheel for enclosing the fastening element forming cavities and gate portions of the channels in the cavity wheel leaving portions of the channels exposed between the pair of bands, two pairs of annular grooves in the periphery of the cavity wheel intersecting at right angles the respective rows of cavities for receiving and holding respective pairs of connecting filaments for the trains of filaments;

injection means for injecting a synthetic polymer resin into the channels between the pairs of bands;

means for separating the pair of trains of fastening elements and attached runners formed in the channels from the cover band; and means for severing the runners from the pair of trains of fastening elements.

6. An apparatus for forming a pair of trains of fastening elements as claimed in claim 5 wherein the cavity wheel has an annular rib between the pair of bands for maintaining the bands spaced apart, the channels being cut through the rib, and the injecting means includes an injection shoe slidably engaging the rib and portions of the pair of bands adjacent the rib.

7. An apparatus for forming a pair of trains of fastening elements as claimed in claim 5 wherein at least one of the adjacent edges of the pair of bands has cut outs formed therein over the channels, and the injecting means includes an injection shoe slidably engaging the adjacent edges of the bands for injecting synthetic polymer resin through the cut outs into the channels.

8. An apparatus for forming a pair of trains of fastening elements as claimed in claim 5 wherein the injection means includes an injection shoe slidably engaging inner portions of the pair of bands, said injection shoe having a rib extending between the inner edges of the pair of bands for maintaining the bands spaced apart.

9. An apparatus for forming a pair of trains of fastening elements comprising a rotatable cavity wheel having a pair of spaced rows of fastening element forming cavities in the periphery of the cavity wheel;

said cavities each having a head forming portion and a pair of leg forming portions extending from opposite sides of the head forming portion;

said head forming portion and leg forming portions extending in a straight line parallel the axis of the cavity wheel;

a pair of rows of entrance channels in the periphery of the cavity wheel on respective opposite sides of the pair of rows of cavities wherein the entrance channels communicate through gate portions of the entrance channels into ends of the cavities in the respective rows of cavities;

a cover band engaging the periphery of the cavity wheel over a predetermined arcuate portion between first and second angular positions of the cavity wheel for enclosing the fastening element forming cavities and gate portions of the entrance channels in the cavity wheel leaving portions of the entrance channels exposed on opposite sides of the band, two pairs of annular grooves in the periphery of the cavity wheel intersecting at right angles the respective rows of cavities for receiving and holding respective pairs of connecting filaments for the trains of filaments;

injection means for injecting a synthetic polymer resin into the entrance channel on opposite sides of the band;

means for separating the pair of trains of fastening elements and attached runners formed in the entrance channels from the cover band; and means for severing the runners from the pair of trains of fastening elements.

10. An apparatus for forming a pair of trains of fastening elements as claimed in claim 9 including a row of center channels in the periphery of the cavity wheel between the pair of rows of cavities wherein each of the center channels communicates into respective inside ends of cavities in each of the pair of rows of cavities.

* * * * *